United States Patent [19]

Abbin et al.

[11] Patent Number: 4,868,072

[45] Date of Patent: Sep. 19, 1989

[54] LIQUID METAL THERMAL ELECTRIC CONVERTER

[75] Inventors: Joseph P. Abbin; Charles E. Andraka; Laurance L. Lukens; James B. Moreno, all of Albuquerque, N. Mex.

[73] Assignee: The United States of America as represented by the United States Department of Energy, Washington, D.C.

[21] Appl. No.: 225,442

[22] Filed: Jul. 28, 1988

[51] Int. Cl.[4] .................... H01M 10/39; H01M 14/00
[52] U.S. Cl. ......................................... 429/11; 429/104
[58] Field of Search .................................. 429/11, 104

[56] References Cited

U.S. PATENT DOCUMENTS

| | | | |
|---|---|---|---|
| 3,458,356 | 7/1969 | Kummer et al. | 136/83 |
| 3,922,176 | 11/1975 | Robinson et al. | 136/6 |
| 3,946,751 | 3/1976 | Breiter et al. | 136/6 |
| 3,953,227 | 4/1976 | Jones et al. | 136/6 |
| 4,037,027 | 7/1977 | Desplanches et al. | 429/104 |
| 4,042,757 | 8/1977 | Jones | 429/104 |
| 4,054,728 | 10/1977 | Broadhead | 429/104 |
| 4,098,958 | 7/1978 | Bettman | 429/17 |
| 4,117,208 | 9/1978 | Ludwig | 429/104 |
| 4,220,692 | 9/1980 | Hunt | 429/104 |
| 4,505,991 | 3/1985 | Weber | 429/11 |
| 4,510,210 | 4/1985 | Hunt | 429/11 |

OTHER PUBLICATIONS

T. Cole, "Thermoelectric Energy Conversion With Solid Electrolytes", *Science*, vol. 221, No. 4614, Sep. 2, 1983, pp. 915-920.

E. Lindsley, "Sodium+Sunshine =Electricity", *Popular Science*, Dec. 1983, pp. 22-24.

T. Hunt, "Research Program On The Sodium Heat Engine", Phase 4, Final Report, 1986, DOE/CE/406-51-1.

*Primary Examiner*—Donald L. Walton
*Attorney, Agent, or Firm*—George H. Libman; James H. Chafin; Hightower: Judson R.

[57] ABSTRACT

A liquid metal thermal electric converter which converts heat energy to electrical energy. The design of the liquid metal thermal electric converter incorporates a unique configuration which directs the metal fluid pressure to the outside of the tube which results in the structural loads in the tube to be compressive. A liquid metal thermal electric converter refluxing boiler with series connection of tubes and a multiple cell liquid metal thermal electric converter are also provided.

12 Claims, 7 Drawing Sheets

LIQUID METAL THERMAL ELECTRIC CONVERTER

The Government has rights in this invention pursuant to Contract No. DE-AC04-76DP00789 between the U.S. Department of Energy and AT&T Technologies, Inc.

BACKGROUND OF THE INVENTION

The present invention relates to a liquid metal thermal electric converter (LMTEC). The LMTEC is a thermodynamic heat engine which converts heat directly to electricity. More particularly, the present invention relates to a LMTEC having a unique $\beta''$-alumina tube configuration. Further, the present invention relates to a multiple-cell LMTEC having a refluxing boiler with a series connection of cells.

A device which converts heat energy directly to electric energy generally comprises an enclosed container which is separated into a first and second reaction zone by means of a solid electrolyte. A liquid metal is present in the first reaction zone (i.e., on one side of the solid electrolyte) and during operation of the device, the first reaction zone is maintained at a temperature $T_2$ and a pressure $P_2$ which is higher than the temperature $T_1$ and pressure $P_1$ of the second reaction zone, which creates a metal-vapor pressure differential between the two reaction zones. In the lower pressure second reaction zone, a porous or permeable electrically conducting electrode is in contact with the solid electrolyte. Further, during operation a heat source maintains the temperature of the liquid metal within the first reaction zone at the high temperature $T_2$ and corresponding high vapor pressure $P_2$. Metal ions are caused to migrate through the solid electrolyte by the pressure differential while the electrons are caused to move through an external circuit to do useful work and then come in contact with the porous electrode, wherein the metal ions are neutralized to their elemental state at the solid electrolyte-porous electrode interface. The elemental metal is then caused to evaporate from the porous electrode and to migrate through the low pressure $P_1$ second reaction zone (i.e., a vacuum space) to a low temperature $T_1$ condenser and form a condensed liquid metal. The condensed liquid metal is then returned to the higher temperature region within the first reaction zone, e.g., by means of a return line and a pump, to complete a closed cycle. Thus, in summary, during operation of the device, the metal passes from the first reaction zone to the second reaction zone and is pumped back to the first reaction zone. The process occurring in the solid electrolyte and at the solid electrolyte-porous electrolyte interface is approximately equivalent to an isothermal expansion of the metal from pressure $P_2$ to $P_1$ at the temperature $T_2$.

The process of direct energy conversion is characterized by the independence of size vs. efficiency, the absence of moving parts, high reliability, quietness, lack of vibration, low maintenance, simple startup, and absence of pollution problems. Further, the work output of the process is electrical only.

Exemplary thermoelectric devices to which the improvement of the present invention applies and the principles of operation thereof have been described in U.S. Pat. Nos. 3,458,356, 4,098,958, 4,220,692, 4,505,991 and 4,510,210. "Sodium Heat Engines" (SHE) is the name commonly given to such thermoelectric devices which electrochemically expand sodium metal across a solid electrolyte. While other metals may be employed in the device of this invention, the sodium heat engine is described herein as exemplary of such devices. The SHE design places the porous electrode on the outside of the $\beta$-alumina tube and the high temperature (high pressure) liquid sodium on the inside of the tube. This configuration creates tensile stresses in the ceramic $\beta$-alumina tube. The choice of sodium as the working fluid minimizes these stresses to a low level, but requires the engine to operate at a relatively high temperature, 700° to 1,000° C., for modest efficiencies.

U.S. Pat. No. 4,042,757 discloses a system where high-pressure sodium is on the outside of an alumina tube and a porous electrode is on the inside. Because the condensor of this patent is inside the tube, it has higher radiative losses than would a remote condensor. In addition, the use of the porous electrode for the conduction of current along the length of the tube could limit current flow through the relatively high resistance electrode.

Since the power from a SHE or LMTEC is limited by the area of the $\beta''$-alumina tube, for a given tube size, multiple tubes must be used to increase the power output. The SHE or the LMTEC is also a low voltage, high current device. Therefore, when multiple tubes are used it is very desirable to connect them in series. The SHE design has liquid sodium completely filling the $\beta''$-alumina tube, thereby limiting the ways that the $\beta''$-alumina tubes can be connected in series. For example, the tubes could be isolated, with a sodium reservoir for each tube. This option is basically the series connection of single tube SHE's, and it requires multiple pumps, boilers and condensors. Another option is to supply the series connected tubes from a single sodium reservoir through small sodium lines. This configuration results in internal electrical shorting of the series connected tubes through the sodium supply lines, and it limits the number of series connected tubes.

SUMMARY OF THE INVENTION

It is an object of the present invention to have a LMTEC tube with the high temperature, high pressure working fluid on the outside so the structural loads in the tube are compressive.

It is another object of this invention to have a LMTEC tube permitting a series connection of cells.

It is a further object of this invention to have a LMTEC tube allowing for the use of alternative working fluids (i.e., Hg and K) which results in higher efficiencies being obtainable with the use of lower peak temperatures.

It is also an object of this invention to use a refluxing system for condensing metal vapor on the outside of a cell to prevent electrical shorting of multiple cells.

It is still another object of this invention to have a LMTEC design with a remote condensor to reduce thermal losses.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a liquid metal thermal electric converter comprising a hollow container containing liquid and vapor metal. An electrochemical cell in the container has a tube sized to provide a space for the metal between the outer wall of said tube and the inner wall of said container. The tube, consisting of a material for passing only ionized metal vapor into said tube, has a closed end spaced from the bottom of the container and an opposite open end extending through the top of the container. A porous electrode is on the inner wall of the tube. Conductive means are provided for conducting free electrons from said metal to a load while internal bus means, disposed within tube, conducts free electrons from the load, the internal bus comprising an electrically conductive rod. Contacts electrically connect the rod to the porous electrode, whereby the electrons recombine with the ionized metal to form an electrically neutral metal vapor. A vapor condensor is operably connected to the interior of said tube for condensing the neutral metal vapor inside the tube to a liquid state. Liquid metal return means return liquid metal from the condensing means to said container.

In a preferred embodiment of the invention, a plurality of cells are provided within a container of liquid and vapor metal, the cells being electrically connected in series from an external bus on the outside of one cell to the internal rod of the next cell.

DETAILED DESCRIPTION OF THE INVENTION

Figure 1:
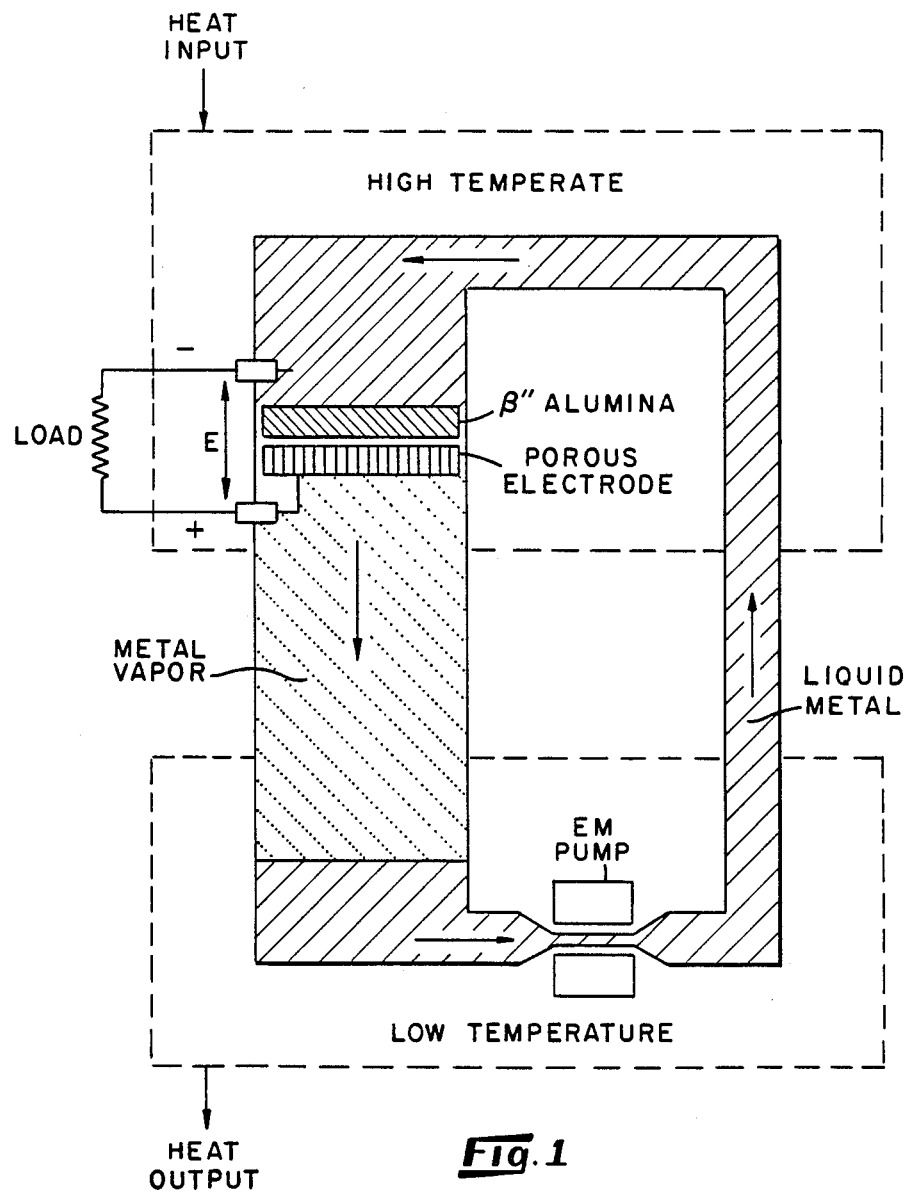
FIG. 1 is a schematic of a LMTEC cycle.

A Liquid Metal Thermal Electric Converter (LMTEC) is a thermodynamic heat engine which converts heat directly to electricity. A schematic of the LMTEC cycle is shown in FIG. 1. Liquid metal ionizes in the high temperature zone and the ions are forced through an ion-conducting ceramic such as $\beta$-alumina or $\beta''$-alumina, by the pressure differential between the high temperature and low temperature zones of the engine. The electrons liberated by the ionization process are forced through an external circuit where they are made to do useful work. The electrons are rejoined with the metal ions in a porous electrode on the other side of the $\beta''$-alumina. Metal vapor flows from the porous electrode to the low temperature zone where it is condensed to liquid form. The liquid metal is then pumped by an electromagnetic pump to the high temperature zone completing the cycle.

Figure 2:
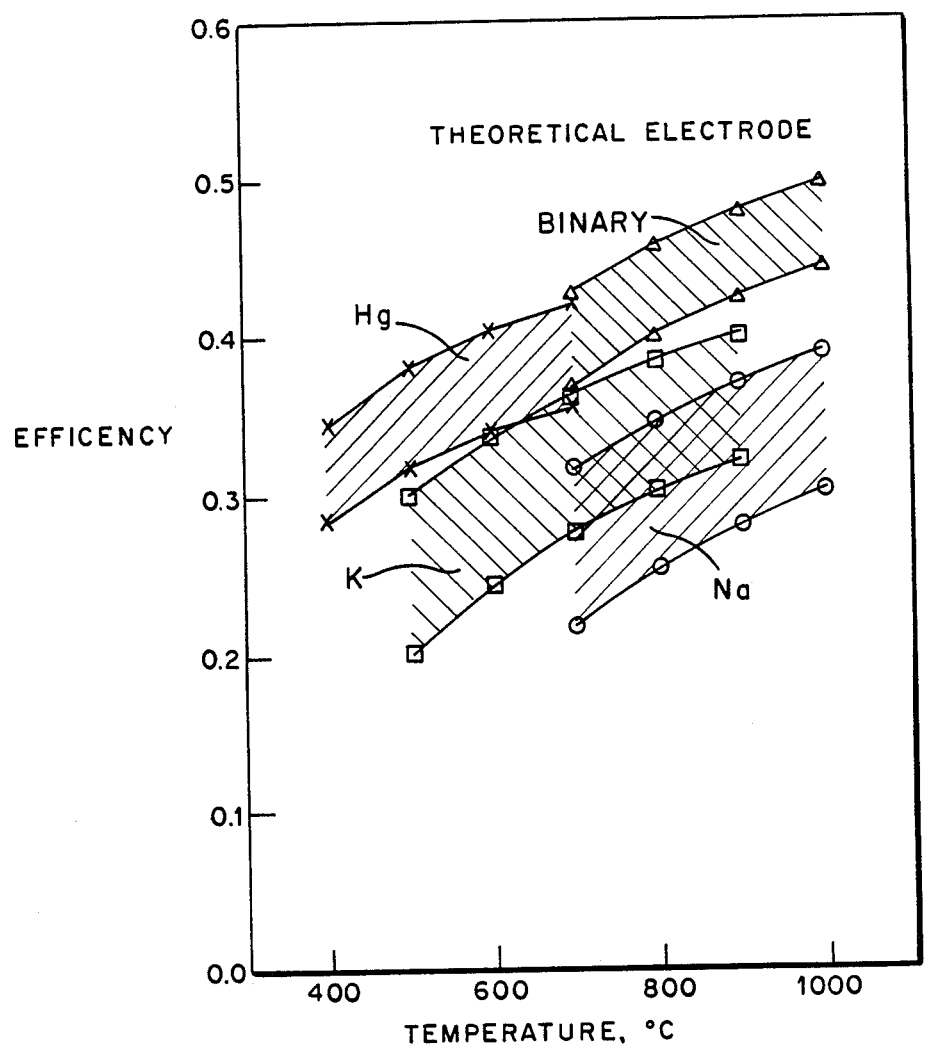
FIG. 2 illustrates the relationship of the efficiency of various liquid metals vs. operating temperatures.

The LMTEC design of the present invention incorporates a unique configuration of the electro-chemical cell including the $\beta''$-alumina tube and associated electrical connections. The high temperature high pressure working fluid is on the outside of the tube and the structural loads in the tube are compressive. The porous electrode is on the inside surface of the $\beta''$-alumina tube. This feature allows alternate working fluids (such as potassium or mercury) with higher working pressure ratios across the $\beta''$-alumina to be used because of the more favorable structural loading on the $\beta''$-alumina tube. As shown in FIG. 2, these alternate working fluids could allow the LMTEC to operate at much lower temperatures with efficiencies comparable to or greater than those obtainable with sodium. However, the LMTEC tube configuration will also increase the reliability of the tubes when sodium is used as the working fluid because of the more favorable structural loading on the $\beta''$-alumina tube.

The unique configuration of the $\beta''$-alumina tube also makes it much easier to incorporate a unique remote condenser into the LMTEC design. In earlier designs such as the SHE, the hot $\beta''$-alumina tube faces or is surrounded by the much cooler condenser surface. This results in large thermal losses, which in turn reduce the thermal to electrical efficiency of the engine. The remote condenser does not allow the hot low pressure side of the $\beta''$-alumina to have a direct view of the cool condenser surface and substantially reduces the radiation heat transfer losses. The reduction in radiation heat transfer is traded off with an increase in pressure drop for metal vapor flow between the $\beta''$-alumina tube and the condenser. However, the calculated performance of the engine indicates that the reductions in radiation heat transfer of the remote condenser more than compensate for the pressure losses.

Figure 3:
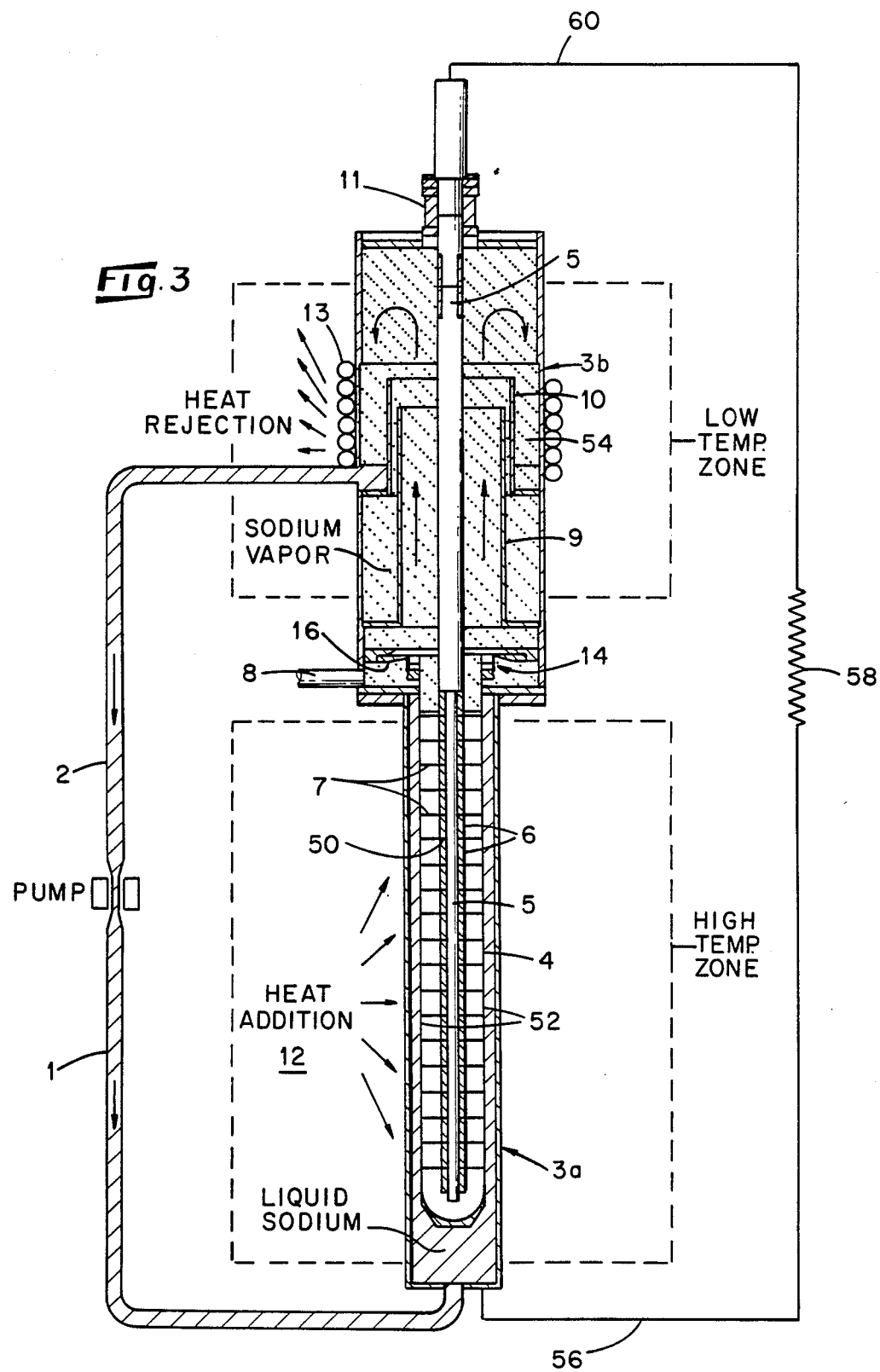
FIG. 3 illustrates a bench test module.

A LMTEC Bench Test Module (BTM) which includes the unique configuration of the $\beta''$-alumina tube and the remote condenser has been designed and fabricated. A schematic of the LMTEC BTM which identifies the elements of the LMTEC is shown in FIG. 3. The LMTEC Bench Test Module will verify the function of the $\beta''$-alumina tube configuration, the internal porous electrode, and the internal current distribution system. In the embodiment of FIG. 3, current is conducted through the liquid metal to the metal case and the load.

FIG. 3 shows a stainless steel high pressure return line 1, low pressure return line 2, a high temperature container 3a and a low temperature container 3b. Tube 4, which could be a dome shape or any other shape capable of withstanding pressure from its outside and having one open end, is formed of an ion conductor having a porous electrode coated on the inside thereof. The ion conductor is preferably a $\beta''$-alumina ceramic conductor and the porous electrode is molybdenum or tungsten. Center or internal bus 5 extends through the open end of tube 4 and comprises a rod which may be threaded at the high temperature end and is composed of an electrically conductive material, such as dispersion strengthened copper, molybdenum or the like.

Figure 5:
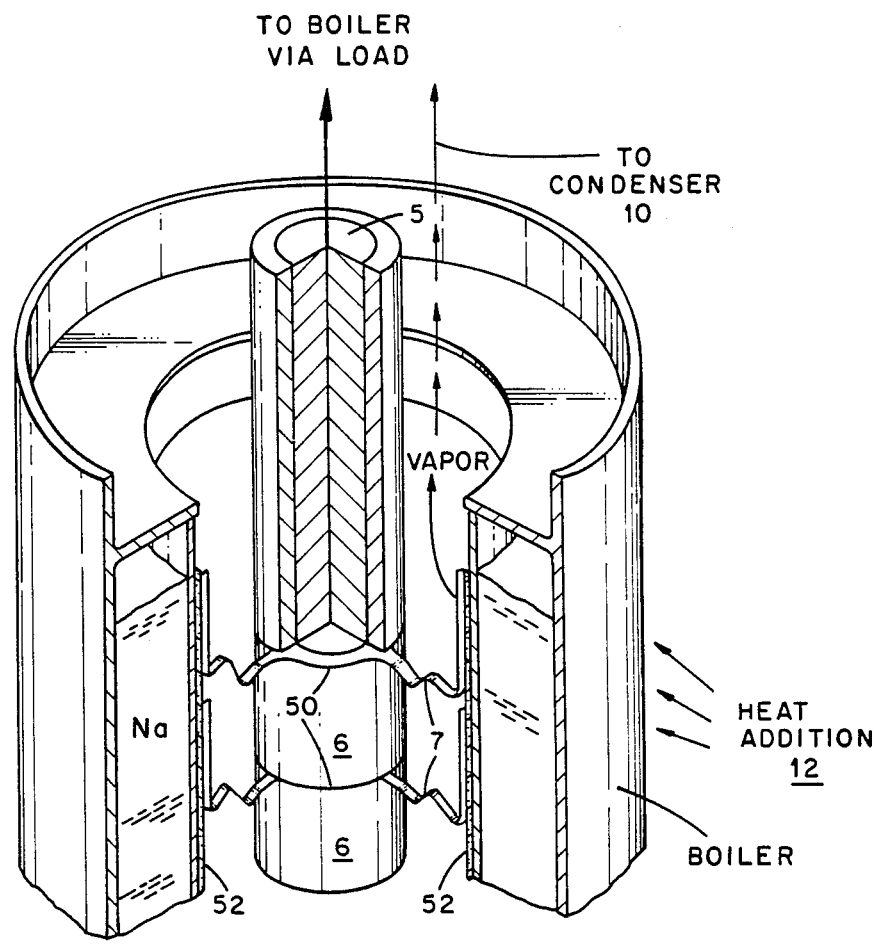
FIG. 5 illustrates the boiler and electrode section of the LMTEC bench test module.

As shown in FIG. 5, nuts 6 are held by the threaded portion of center or internal bus 5. Eight radial contact fingers 7 extend outwardly from a ring 50 having an inside diameter sized to slide over bus 5 and which is held in place between two nuts 6 in a sandwich arrangement. Nuts 6 may be composed of the same material as center or internal bus 5. Molybdenum contact fingers 7 are in spring contact with the porous electrode 52 of tube 4. Contact fingers 7 may individually be of any shape, including a loop formed between two spaced nuts with the middle portion thereof contacting the electrode, so long as they do not block metal vapor flow. The contact fingers may be cut from sheet stock as an integral assembly by electric discharge machining, stamping, or other suitable techniques that do not form part of this invention.

The open end of tube 4 is connected to the remote condensor in low temperature container 3b through a hermetic joint 14, described hereinafter. A vacuum line 8 is provided to evacute the device before operation; it is valved off during operation. Thermal radiation shield 9 directs vapor from the interior of tube 4 into container 3b while preventing premature condensation of the vapor. Thermal radiation shield 9 is composed of stainless steel and is of any shape. Condensor 10 surrounds shield 9 and defines a sump space 54 with the colder wall of container 3b. In operation, vapor condenses against the colder walls of container 3b and condensor 10, and the condensate falls into sump space 54.

In this embodiment, the electrons stripped by ceramic tube 4 flow through the liquid sodium and a lead 56 to a load 58. From load 58, the current path is completed through a lead 60 which proceeds into the device through a dielectric feedthrough 11 where it connects with the external end of center or internal bus 5 at the upper end thereof.

Heater 12 is positioned at the high temperature zone end of container 3a. Cooling coils 13, with air or fluid circulation, are positioned in the low temperature zone to cool the portion of the wall of upper pressure container 3b positioned therein. Cooling coils 13 are composed of copper or stainless steel.

In the tested embodiment of FIG. 3, tube 4 was 2.5 cm (1 inch) in diameter and 22 cm long, with a 3 um thick porous tungsten electrode 52. contact fingers 7 had a thickness of about 0.1 mm.

Figure 4:
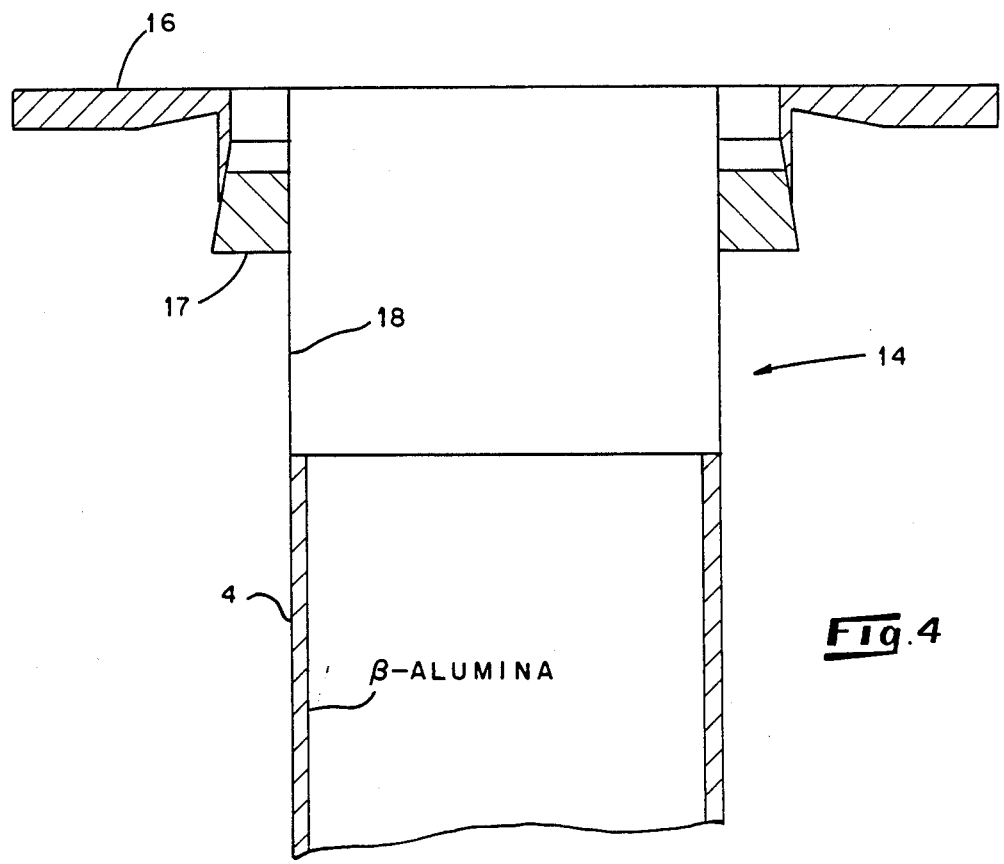
FIG. 4 illustrates the $\beta''$-alumina to metal joint of the LMTEC bench test module of FIG. 3.

The LMTEC BTM design advantageously employs a high temperature hermetic joint between $\beta''$-alumina tube 4 and a stainless steel bulkhead 16 which separates the high temperature zone from the low temperature zone. As shown in FIG. 4, a molybdenum ring 17, having a cross-section approximately 0.5 cm $\times$ 0.5 cm, is brazed to bulkhead 16 on its outside diameter, and to a molybdenum sleeve 18 on its inside diameter. Bulkhead 16 is provided with a thin, tapered, sleeve at the braze joint. A nickel based braze alloy is used for the molybdenum to molybdenum, and the molybdenum to stainless steel brazes. The 2.5 cm long molybdenum sleeve has a wall thickness ranging from 0.15 mm at the end brazed to the molybdenum ring to 0.03 mm at the opposite end. The thin end of the molybdenum sleeve is brazed to the $\beta''$-alumina tube with a titanium based active metal braze alloy. The thin molybdenum sleeve minimizes stresses on the $\beta''$-alumina tube. The relatively massive molybdenum ring matches the expansion of the thin sleeve and transmits the high strain to the stainless steel bulkhead 16. The stainless steel is relatively ductile and yields for many more thermal cycles than the thin molybdenum sleeve. This joint design is tolerant of the large mismatch used in construction of the rest of LMTEC, and maintains the hermetic seal required for a practical engine.

The bench test model (FIG. 3) used liquid sodium as the working fluid. In operation, heat is added to the sodium through the wall of the pressure container at the high-temperature zone to maintain the liquid-sodium temperature at 800° C. the heat is produced by an electrical heater clamped to the wall, but in a practical device the heat source could be a flame, heat from a nuclear reactor, or solar thermal radiation. The wall of the LMTEC at container 3b is maintained at 200°-400° C. by forcing air through the cooling coils 13. With the load removed from the electrical circuit, a voltage of approximately 0.9 volts is observed. When a load is connected, current flows and this voltage is decreased. When electrical current flows, it is a result of the voltage that is caused to appear across the $\beta''$-alumina wall. This voltage in turn is a result of the vapor-pressure difference across the $\beta''$-alumina wall, which is maintained by the aforementioned heating and cooling. The current corresponds to the electrons leaving the liquid sodium in the heat-addition zone, moving through the metal wall of the LMTEC into the external circuit, through the electrical load, and back into the LMTEC through the dielectric feed-through. The electrons move down the bus, out from the bus to the porous electrode via the radial fingers, and through the electrode to the electrode interface with the $\beta''$-alumina. At the same time, sodium ions move through the $\beta''$-alumina from the heated liquid sodium side to the porous-electrode side. The electrons recombine with the ions at the interface forming neutral atoms of sodium which then pass through the porous electrode. The sodium atoms are vaporized from the electrode surface, and passed as vapor flow to the cooled wall of the LMTEC and condensed. The condensate is then caused to flow by gravity through return line 2 to the electromagnetic pump which raises the liquid pressure in order for the condensate to flow back to the heated zone, thus completing the cycle.

The LMTEC design of the present invention has a unique refluxing boiler design for multiple tube engines which utilizes metal vapor transport for heat and mass transfer. This feature allows the internal series connection of an essentially unlimited number of $\beta''$-alumina tubes without the multiple equipment required for liquid immersed tubes. A single working fluid reservoir is used with no internal shorting through the metal working fluid.

Figure 6:
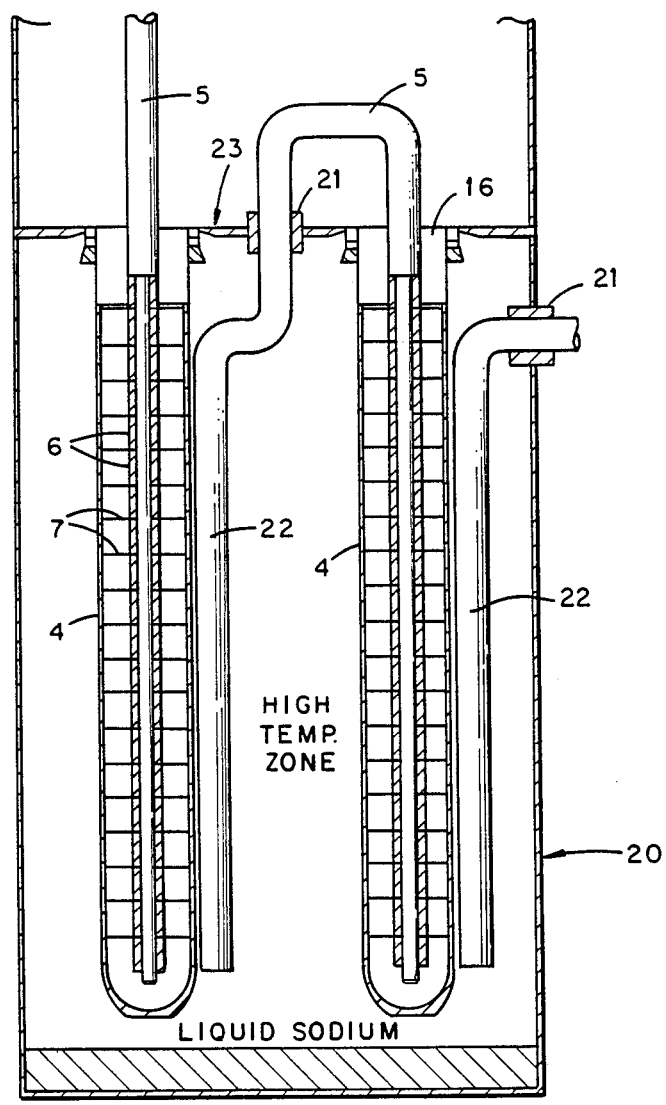
FIG. 6 illustrates a LMTEC refluxing boiler with series connection of tubes.

A schematic of a LMTEC refluxing boiler illustrating the series connection of tubes without shorting from the liquid sodium in the high temperature zone is shown in FIG. 6 to include a boiler shell 20, having contained therein, a plurality of tubes 4 connected in series. An external bus 22 from one tube 4 passes through bulkhead 23 having an insulated feed through 21 and connects to the center or internal bus 5 of the next tube 4 in the series connection. The external bus 22 from the last tube 4 in the series passes to the outside of the engine as one of the power terminals of the engine. The large diameter electrical connections between tubes 4 are all within the high temperature zone of the LMTEC, so that no path for thermal losses exists between tubes 4. Boiler shell 20 is composed of, e.g., stainless steel, inconel, and the like. Insulated feedthroughs 21 are composed of, e.g., high purity alumina, nickel, copper, and the like. External bus 22 is composed of the same material as center or internal bus 5 and is fastened to the external surface of tube 4 with molybdenum wire wrapping.

In operation of the LMTEC having the unique refluxing boiler design, heat is added to the liquid metal, which vaporizes, and moves as a vapor to the external surface of the $\beta''$-alumina tubes, where it condenses. The heat of condensation is partially converted to electrical energy as the metal ions pass through the $\beta''$-alumina. The metal ions are neutralized at the porous electrode. The electrons produced from this process enter the internal bus of the first tube from the external circuit. The electrons enter the internal bus of the next tube from the external bus attached to the previous tube. The electrons from the external bus of the last tube of the series exit the LMTEC through the insulated feedthrough in the boiler wall to pass to the external circuit.

Figure 7:
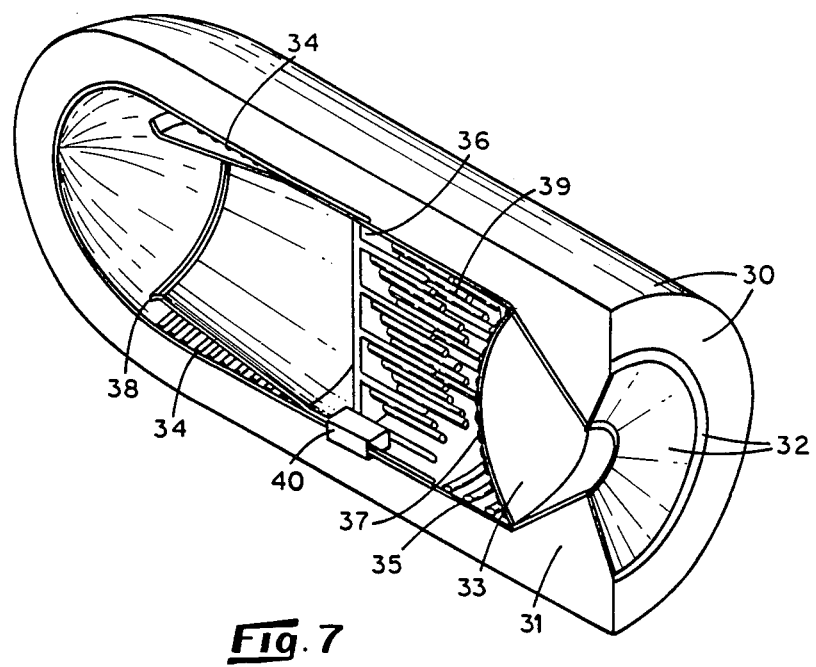
FIG. 7 illustrates a multiple cell LMTEC.

A design of a multiple cell LMTEC for solar thermal dish electric applications is shown in FIG. 7 to include outer shell 30, composed of, e.g., aluminum, thermal insulation 31, composed of, e.g., mineral wool and aperture shield 32, composed of, e.g., mineral-fiber board. Further shown are receiver 33, condenser 34, boiler 35 and bulkhead 36, all of which are composed of, e.g., stainless steel, inconel, and the like. Also illustrated are wick 37 for liquid metal, composed of, e.g., stainless steel mesh layers and radiation shield 38, composed of e.g., stainless steel. Multiple cells, which are individually LMTEC cell 39, are also shown. (Details of two cells electrically connected in series and details of sealing of the cells to the bulkhead are shown in FIG. 6.) Pump 40 is shown and is used for returning liquid metal from condenser 34 to boiler 35. Pump 40 may be of a direct-current electromagnetic type-design which is well-known in the prior art.

In operation of the multiple cell LMTEC of FIG. 7, focused sunlight is allowed to center the receiver through the aperture shown on the right-hand side. The sunlight is converted to heat on the receiver by absorption. Liquid metal is vaporized from the wick by the heat and condensed on the individual LMTEC cells. The metal ions passing through each LMTEC cell are neutralized. The resulting metal atoms are vaporized and flow as vapors to the condenser, where the vapors are caused to condense and the condensate is pumped back to the wick.

The combination of the LMTEC with lower temperature heat engines to yield very high combined cycle efficiencies is quite advantageous. Such a cycle is referred to as a binary cycle. In the binary cycle, the heat rejected from the topping cycle becomes the heat input to the bottoming cycle. Performance calculations for such a cycle are shown in FIG. 2. A preferred combination is a LMTEC topping engine combined with a Rankine bottoming engine using either steam or toluene as the working fluid. These are both new and unique combinations.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A liquid metal thermal electric converter comprising:
   hollow container means for containing liquid and vapor metal;
   a liquid and vapor metal;
   an electrochemical cell comprising:
      a tube, disposed within said container and sized to provide a space between the outer wall of said tube and the inner wall of said container, said tube having a closed end spaced from the bottom of said container, an opposite open end extending through the top of said container, and a porous electrode on its inner wall, said tube consisting of material means for passing only ionized metal vapor into said tube;
      conductive means for conducting free electrons from the outer wall of said tube to a load;
      internal bus means, disposed within said tube, for conducting free electrons from said load, said internal bus comprising an electrically conductive rod; and
      contact means for electrically connecting said rod to said porous electrode, whereby the electrons recombine with the ionized metal vapor to form an electrically neutral metal vapor;
   vapor condensing means, operably connected to the interior of said tube means, for condensing the neutral metal vapor inside said tube to a liquid state; and
   liquid metal return means for returning liquid metal from said condensing means to said container.

2. The liquid metal thermal electric converter of claim 1 wherein the metal is sodium.

3. The liquid metal thermal electric converter of claim 1 wherein the metal is potassium.

4. The liquid metal thermal electric converter of claim 1 wherein the metal is mercury.

5. The liquid metal thermal electric converter of claim 1 wherein said tube material is $\beta''$-alumina ceramic and said porous electrode comprises molybdenum.

6. The liquid metal thermal electric converter of claim 1 wherein said tube material is $\beta''$-alumina ceramic and said porous electrode comprises tungsten.

7. The liquid metal thermal electric converter of claim 1 wherein said contact means comprises a plurality of conductive spacers interleaved with a plurality of contact finger sets,
   each conductive spacer comprising a tubular member having opposed ends, an inner wall tightly fitting against the surface of said rod, and an outer surface spaced from said electrode;
   each contact finger set formed of thin, springy, metal and having a central ring having an inner diameter larger than the diameter of said rod, and at least one finger extending from an outer diameter of said ring in spring contact with said electrode,
   wherein the central ring of each contact finger set is retained in place between the ends of two adjacent spacers.

8. The liquid metal thermal electric converter of claim 1 wherein said rod is threaded and said spacers consist of nuts threaded on said rod.

9. The liquid metal thermal electric converter of claim 1 wherein said vapor condensing means comprises:
   a tubular outer container having an opening connected to an input of said liquid metal return means;
   means for cooling the outer surface of said container;
   a tubular condensor axially aligned within said container;
   ring sump means connected between the inner wall of said container and the outer wall of said condensor to form a sump for condensed liquid metal, the opening in said container being adjacent said sump means; and
   a tubular radiation shield axially aligned within said condensor and having an input end for receiving metal vapor from said tube, and an output end adjacent an end of said condensor.

10. The liquid metal thermal electric converter of claim 1 including a plurality of said exchange cells within said hollow container means, each cell having:

said internal bus means extending from the open end of said tube into said tube;

said conductive means comprising an external bus extending from the outer surface of the tube;

the internal bus of a first tube being connected to said load;

the external bus of a last tube being connected to said load;

the external bus of each other tube being connected to the internal bus of another tube, all tubes being connected in series between said load; and each of said exchange cells being immersed only in metal vapor to prevent electrical shorting of multiple cells.

11. The liquid metal thermal electric converter of claim 1 wherein said vapor condensing means is connected to the open end of said tube through a high temperature hermetic joint comprising:

a bulkhead between said vapor condensing means and said tube, said bulkhead having an opening aligned with the open end of said tube;

a molybdenum ring attached to said bulkhead on the outside diameter said ring;

a molybdenum sleeve attached at one end to the inside diameter of said ring and attached at the other end to said tube, said sleeve having a thicker wall thickness at ring end than at the tube end.

12. The liquid metal thermal electric converter of claim 1 wherein said conductive means comprises liquid metal extending between the outer wall of said tube and said container, and an electrical lead extending from said container to said load.

* * * * *